June 27, 1933.  I. H. REINDEL  1,915,694
VALVE SILENCING CONSTRUCTION
Filed Oct. 27, 1927
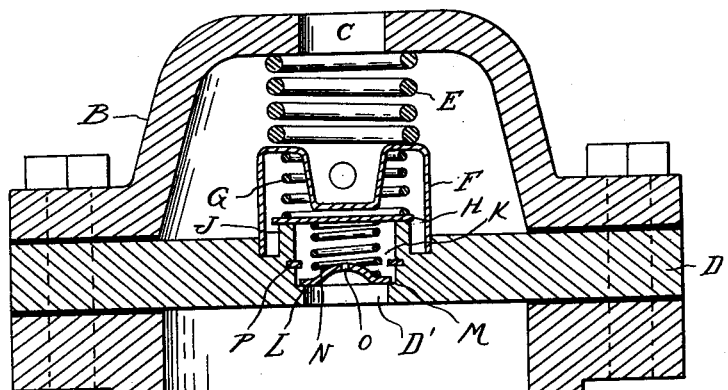
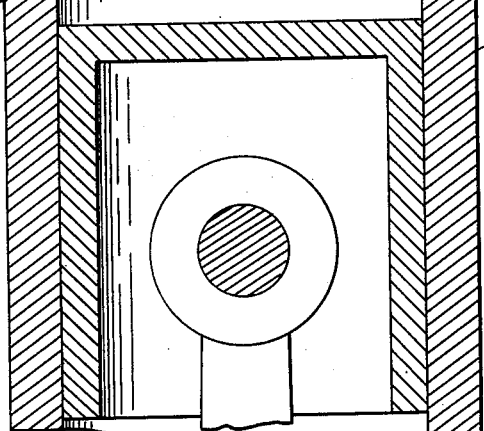
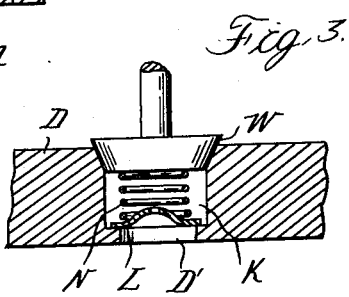
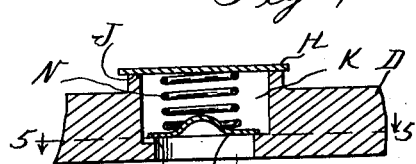
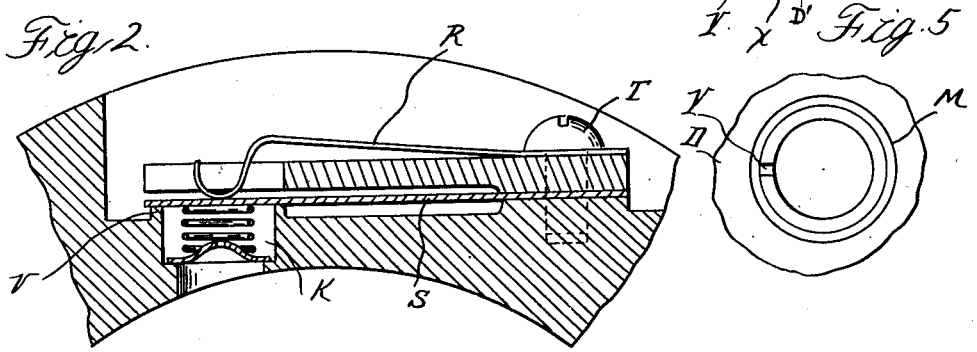
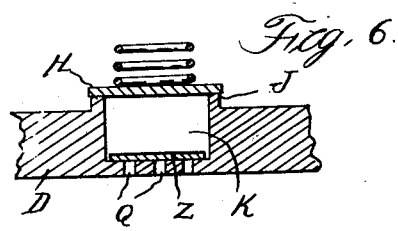
Inventor
Ira H. Reindel
By Swan Frye and Murray
Attorneys Patented June 27, 1933

1,915,694

UNITED STATES PATENT OFFICE

IRA H. REINDEL, OF DETROIT, MICHIGAN

VALVE SILENCING CONSTRUCTION

Application filed October 27, 1927. Serial No. 229,150.

This invention relates to a valve silencer, particularly adapted for use in household mechanical refrigerating mechanism, compressors, check valves, and the like, though by no means restricted to such use, and has for its object an improved organization of parts by means of which the ordinary discharge valve immediately after the passage of the fluid to the high pressure side and at the beginning of a suction stroke is cushioned against sudden and consequently noisy impact upon its seat due to the reduction of pressure in the compressing cylinder. My preferred method of accomplishing this desirable result consists in interposing in the clearance space immediately below the discharge valve an auxiliary chamber, which is bounded on the side nearest the cylinder by a limitedly movable bleeder valve, which, while not entirely shutting off communication into the cylinder, even when seated, is adapted to respond to the uplifting effect of the piston's compressing stroke and the consequent expulsion of fluid from the cylinder, its upward movement being yieldingly opposed and consequently silenced against chattering by a suitable spring, preferably of a strength inferior to that actuating the main discharge valve. Thus I not only accomplish the practically noiseless operation of such a valve but as well make use of the ordinarily and otherwise waste space at the head of the fluid compression chamber immediately beneath the valve.

In the drawing:

Figure 1 is a sectional elevational view, showing the application of my improvement to a disc type discharge valve of a reciprocatory compressor.

Figure 2 is a fragmentary sectional view showing the applicability of my idea to a flapper discharge valve, adapted especially for application to a rotary type of compressor.

Figure 3 is a similar representation of the application of my idea to a poppet valve.

Figure 4 is a sectional elevational view of a slightly modified form of the movable member.

Figure 5 is a plan view of the modified form of construction shown in Figure 4, taken along the line 5—5 thereof.

Figure 6 is a sectional view of a slightly modified form, wherein perforations through the solid wall of the valve plate, overengaged by a loose breather plate may be substituted for a bleed valve and its actuating spring.

A represents a cylinder of a compressor, pump, or similar mechanism, and B the valve-enclosing cage or housing at one end thereof, provided with the usual external communication C and a communication D' guarded and restricted as hereinafter set forth, into the interior of the cylinder A. With one end resting against the outer wall of the cage B, the spring E yieldingly presses with its other end upon the cage F, the edges of which seat in a suitable cut-away or recessed portion of the valve plate D. Within this cage F, and pressing against its top is a second and preferably weaker spring G, whose lower end presses upon the valve disc H to resiliently hold it upon its seat J. If my disclosure stopped with this specific form of valve cage, such a structure would doubtless be subject to the same objections as regards noise as the unsatisfactory constructions now in use. To obviate this, I make the upper end K of the communication D' through the valve plate, which is ordinarily waste clearance space, into a pressure-reducing chamber, whose lower edge is bounded or bordered by the bleeder disc L, which in its lowered position seats against the shoulder M in the aperture D', and whose possible upward movement is yieldingly opposed by the helical spring N, and may in addition, if desired, be positively restricted past a certain point by the stop P which encircles the interior of the chamber K. Since this bleeder disc L is provided with one or more apertures as O, there is afforded, regardless of the raised or lowered position of the valve disc H, a constant though very restricted communication through the passage D' which leads to the interior of the cylinder. During the compressing stroke, as the pressure in the cylinder is increasing, this bleeder valve L is raised against the influence of its spring N just enough to render the pressure prevailing in the chamber K the same as that within the cylinder. When the fluid pressure in these parts exceeds that in the housing B to a degree sufficient to overcome the influence of the spring N, the valve H is raised from its seat J, and the fluid from the cylinder is released past it into the housing B. Just before the valve H returns to its seat when the compression pressure ends, the bleeder valve L returns to its seat under the influence of its weaker spring N, and with practically no noise, thus again constituting with the chamber K a pocket from which fluid can only escape after the seating of the bleeder valve L through the aperture O of the disc L in a relatively limited quantity. The later phases of each seating action of the valve disc H relatively to its seat J are thus so cushioned that the actual contact of the metal surfaces is accomplished with a minimum of noise, if indeed any results. This desirable outcome renders this construction especially useful for the household refrigeration and compressor purposes stated.

In the modified form of construction illustrated in Figure 2, the same organization of parts as regards the pressure-reducing chamber K is retained, but in place of the helical spring-actuated valve, illustrated in Figure 1, a flapper valve, as S, yieldingly pressed downward by the leaf spring R is resorted to, being held with it in position by means of the screw or stud T though seating across the valve surface V in the same manner as regards the pressure-reducing chamber as in the construction shown in Figure 1.

In the poppet-valve construction shown in Figure 3, the pressure-reducing chamber and its parts are the same, the poppet valve W taking the place as to the function of these parts, of the disc valve H of Figure 1, and the flapper valve S of Figure 2.

In the modified form of construction shown in Figures 4 and 5, the valve disc, the pressure reducing chamber, and the spring which it encloses are substantially the same as shown in Figure 1, but in place of the disc being apertured, as at O therein, I provide an undercut bleeder outlet Y at one side or edge of the unperforated disc X there shown; this affords the same permanent leakage or potential bleeding function as is performed by the other type of disc.

In Figure 6 I have shown a modified form of construction, wherein I substitute for the vented or bleeder disc L and its spring N, a series of perforations Q through the wall of the valve plate D, over which loosely engages the breather disc or plate Z, limited as to its possible upward movement as in the other forms shown by some such means as the ring or stop P, and of such relative weight and looseness of fit within the cushioning chamber K as to permit the pressure entering through the holes or perforations V to permeate the chamber K before the main valve's lifting takes place.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. The combination, with a cylinder and a valve-enclosing shell positioned at one end thereof, of a spring-actuated valve disc adapted to regulate the fluid flow therebetween, a pressure-reduction chamber interposed between said valve disc and its seat and the interior of the cylinder, a bleeder disc separating said chamber from the interior of the cylinder, and a spring of inferior strength to that associated with said valve disc, adapted to yieldingly hold said bleeder disc in seated position.

2. The combination, with a cylinder and a spring-actuated valve disc controlling the passage of fluid from said cylinder, of a cushioning chamber interposed between said valve disc and its seat and the interior of the cylinder, a bleeder disc bounding that side of said cushioning chamber adjacent the interior of the cylinder and affording a continuous though relatively minute communication therebetween, and a spring adapted to yieldingly oppose the unseating of said bleeder disc except in response to the desired superior pressure incident to the compressing phase of the cylinder's operative activity.

3. In combination with a valve member and a spring for yieldingly holding the same in seated position, a cushioning chamber positioned subjacently thereof, a vented closure disc for the opposite end thereof from that across which said valve disc extends, and a spring of inferior strength to that whereby the valve disc is actuated, whereby said vented disc is yieldingly held in seated position across its end of said cushioning chamber.

4. In combination with a valve seat provided with a subjacent cushioning chamber, a spring-held valve member adapted to cooperate with said seat in yieldingly closing one end of said cushioning chamber, a vented valve member adapted to engage across the opposite end of said cushioning chamber from that engaged by said spring-held valve disc, and resilient means for opposing the displacement of said vented valve member from its position across one end of said cushioning chamber.

5. The combination, with a valve body provided with a valve seat at either end of an intermediately located cushioning chamber, of a pair of valve members for said valve seats, one of said valves having a bleed passage, and a pair of spring members adapted to yieldingly hold said valve members on their seats, that one of said spring members appurtenant to said last named valve member being of inferior strength to its companion spring member.

6. In combination with a valve seat and a spring-actuated valve adapted to normally seat thereon, a cushioning chamber positioned therebeneath, a bleed valve member engaging across the lower end of said cushioning chamber, and a spring of inferior strength to that associated with said valve disc, whereby said bleed valve member is yieldingly held against displacement from its position of closure across its end of said cushioning chambers.

7. In combination with a pair of spaced valve seats and an intermediately positioned cushioning chamber, a pair of valve members adapted to cooperate with said seats, one of said valve members being vented, and a pair of actuating springs for said valve members, that one of said springs appurtenant to said vented valve member being of inferior strength to the other spring.

8. In combination with a cushioning chamber provided with a valve seat at each end, a pair of spring-actuated valves serving as displaceable closure members for the ends of said cushioning chamber, one of said valves being vented and its spring being of inferior strength to the other spring.

9. Means for cushioning the impact of a valve against its seat, having in combination with a valve seat and a spring-actuated valve disc therefor, a fluid chamber located adjacent said valve and its seat, a bleeder valve positioned across another side of said chamber from that whereon said spring-actuated valve disc is located, and resilient means for opposing the pressure-actuated displacement of said bleeder valve from its seat.

10. In combination with a pair of valve members, one of which is vented, an air chamber transversely of whose open portions said valve members are adapted to seat, and spring members for yieldingly holding said valve members on their respective seats.

11. Means for utilizing the waste clearance space encompassed within the the vent aperture of a fluid compressing chamber, comprising, in combination with a chambered enlargement thereof, spring-actuated valve members at each end thereof, one of said valve members being vented and its spring being of inferior strength to the spring appurtenant to the other valve member, whereby its return to its seat at the end of each compression period is caused to precede the corresponding movement of the other valve member, thus creating a fluid cushion for the latter within said chamber.

12. A cushioning chamber interposed between a main valve and a cylinder, on the outer end of which the main valve is seated, having at its end nearer the cylinder an auxiliary valve seated in the opening thereinto, which latter valve opens under the influence of a pressure exerted against it in the same direction as is necessary to open the main valve, a pair of resilient holding elements operatively associated with said main valve and with said auxiliary valve respectively, that one of said elements appurtenant the auxiliary valve being of inferior strength to that appurtenant the main valve, and resultantly permitting the closure movement of the former slightly in advance of the main valve in each operative cycle.

13. Valvular controlling means utilizable in conjunction with a reciprocating compressor, comprising a chamber and a pair of spaced valves associated therewith and adapted to open and close substantially independently of each other, said valves being so arranged that in operation one traps fluid within the chamber to cushion the seating of the other.

14. In combination with the outlet of a reciprocating compressor, a valve located in such outlet and adapted when closed to substantially shut off the same, and a second valve spaced from the first and adapted upon closure of the first mentioned valve to close slightly in advance thereof but not tightly seal the port, to cushion the closing of the first mentioned valve.

15. In combination with a reciprocating compressor, a valve located in the outlet thereof and adapted when closed to substantially shut off the same, and a second valve spaced from the first and closable in advance of the first mentioned valve by the same closing influence but adapted to only partially close the outlet against return leakage, thereby trapping a quantity of fluid between the valves to cushion the closing of the first mentioned valve.

16. Valvular controlling means utilizable in conjunction with a reciprocating pump, a main valve located in position of potential regulation of the outlet, and a second valve spaced from the first and adapted during certain movements of the valves to substantially but not tightly trap a quantity of fluid between them to cushion the operation of the main valve.

17. In combination with a reciprocating pump having an outlet, a valve seat appurtenant the outlet, and a valve movable from and to the same to regulate the fluid flow, and means for cushioning the operation of said valve, comprising another valve spaced from the first and operable cooperatively therewith, said second valve being adapted during certain phases of operation of the valves to substantially trap a quantity of fluid in the space between the valves, to cushion the operation of the first mentioned valve.

18. In combination with a reciprocating pump having an outlet, an outlet valve seat and a valve movable to and from the same to regulate the fluid flow, means for cushioning the operation of said valve comprising another valve spaced from the first and operable cooperatively therewith, said second valve being movable slightly in advance of the first and adapted to intermittently substantially trap a quantity of fluid between the valves to cushion the seating of the main valve.

19. In combination with a reciprocating compressor having an outlet, an outlet valve seat and a valve movable to and from the same to regulate the fluid flow, means for cushioning the operation of said valve comprising a second valve spaced from and operable cooperatively with the first, said second valve being adapted to seat slightly in advance of the main valve to thereby trap a quantity of fluid between the valves to cushion the seating of the main valve.

20. In combination with a fluid conducting medium and means for intermittently applying pressure to the fluid traversing the same, a valve intermittently closable to prevent return movement of the fluid during the intermittent falling of the applied pressure, and means for cushioning the seating of such valve, comprising another valve interposed between the first mentioned valve and the pressure-source, said second valve being operable cooperatively with but slightly in advance of the first, and adapted to substantially trap a quantity of fluid between the valves before each seating of the first mentioned valve, to cushion the closure thereof.

In testimony whereof I sign this specification.

IRA H. REINDEL.